United States Patent
Tkac et al.

(10) Patent No.: US 11,323,615 B2
(45) Date of Patent: May 3, 2022

(54) ENHANCING IMAGES USING ENVIRONMENTAL CONTEXT

(71) Applicant: International Business Machines Corporation, Armonk, NY (US)

(72) Inventors: Vincent Tkac, Delaware, OH (US); Mark Timothy Allen, Scarborough (CA); Scott Guminy, Markham (CA)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 16/541,343

(22) Filed: Aug. 15, 2019

(65) Prior Publication Data

US 2021/0051267 A1 Feb. 18, 2021

(51) Int. Cl.
| | |
|---|---|
| *H04N 5/232* | (2006.01) |
| *G06K 9/62* | (2022.01) |
| *G06Q 20/12* | (2012.01) |
| *G06F 16/583* | (2019.01) |
| *G06V 20/00* | (2022.01) |
| *H04L 67/12* | (2022.01) |
| *G06F 3/16* | (2006.01) |

(52) U.S. Cl.
CPC ....... *H04N 5/23229* (2013.01); *G06F 16/583* (2019.01); *G06K 9/6288* (2013.01); *G06Q 20/123* (2013.01); *G06V 20/00* (2022.01); *G06F 3/16* (2013.01); *G06V 2201/10* (2022.01); *H04L 67/12* (2013.01)

(58) Field of Classification Search
CPC ........... H04N 5/23229; G06K 9/00624; G06K 9/6288; G06K 2209/27; G06Q 20/123; G06F 16/583; G06F 3/16; H04L 67/12
See application file for complete search history.

(56) References Cited

U.S. PATENT DOCUMENTS

| | | | |
|---|---|---|---|
| 9,910,865 B2 | 3/2018 | Mikolajczyk et al. | |
| 9,912,831 B2 | 3/2018 | Goldberg et al. | |
| 2010/0275235 A1* | 10/2010 | Joo | H04N 21/435 725/74 |
| 2011/0096148 A1* | 4/2011 | Stratmann | G01J 5/025 348/46 |
| 2012/0098946 A1 | 4/2012 | Seung | |
| 2012/0169855 A1* | 7/2012 | Oh | H04N 7/185 348/61 |
| 2012/0191231 A1 | 7/2012 | Wang | |
| 2013/0027571 A1* | 1/2013 | Parulski | H04N 5/772 348/207.11 |

(Continued)

OTHER PUBLICATIONS

Holleis et al., "Adding Context Information to Digital Photos", 25th IEEE International Conference on Distributed Computing Systems Workshops, Jun. 2005, 7 pages. http://ubicomp.net/wp/wp-content/uploads/2017/10/sensor-camera-2004.pdf.

(Continued)

*Primary Examiner* — Lin Ye
*Assistant Examiner* — Tuan H Le
(74) *Attorney, Agent, or Firm* — Stosch Sabo

(57) ABSTRACT

An image is captured using an image recorder. A set of contextual data associated with the image is also captured. The image is annotated with information describing the set of contextual data. A user is notified of the image and the set of contextual data, based on the annotated information that describes the set of contextual data.

20 Claims, 7 Drawing Sheets

(56) References Cited

U.S. PATENT DOCUMENTS

| | | | |
|---|---|---|---|
| 2014/0013193 A1* | 1/2014 | Selinger | G06F 16/433 |
| | | | 715/203 |
| 2015/0256866 A1* | 9/2015 | Finnerty | H04N 21/812 |
| | | | 725/32 |
| 2019/0347522 A1* | 11/2019 | Nir | G06K 9/6257 |

OTHER PUBLICATIONS

Mell et al., "The NIST Definition of Cloud Computing", Recommendations of the National Institute of Standards and Technology, Sep. 2011, 7 pages.

* cited by examiner

ENHANCING IMAGES USING ENVIRONMENTAL CONTEXT

BACKGROUND

The present disclosure relates generally to the field of content creation and presentation, and more particularly to enhancing images using environmental context.

Devices that display visual media may display a single image, a slideshow of images, or videos. Traditional devices may play back the content within the image/video itself.

SUMMARY

Embodiments of the present disclosure include a method, computer program product, and system for enhancing an image with contextual data.

An image is captured using an image recorder. A set of contextual data associated with the image is also captured. The image is annotated with information describing the set of contextual data. A user is notified of the image and the set of contextual data, based on the annotated information that describes the set of contextual data.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
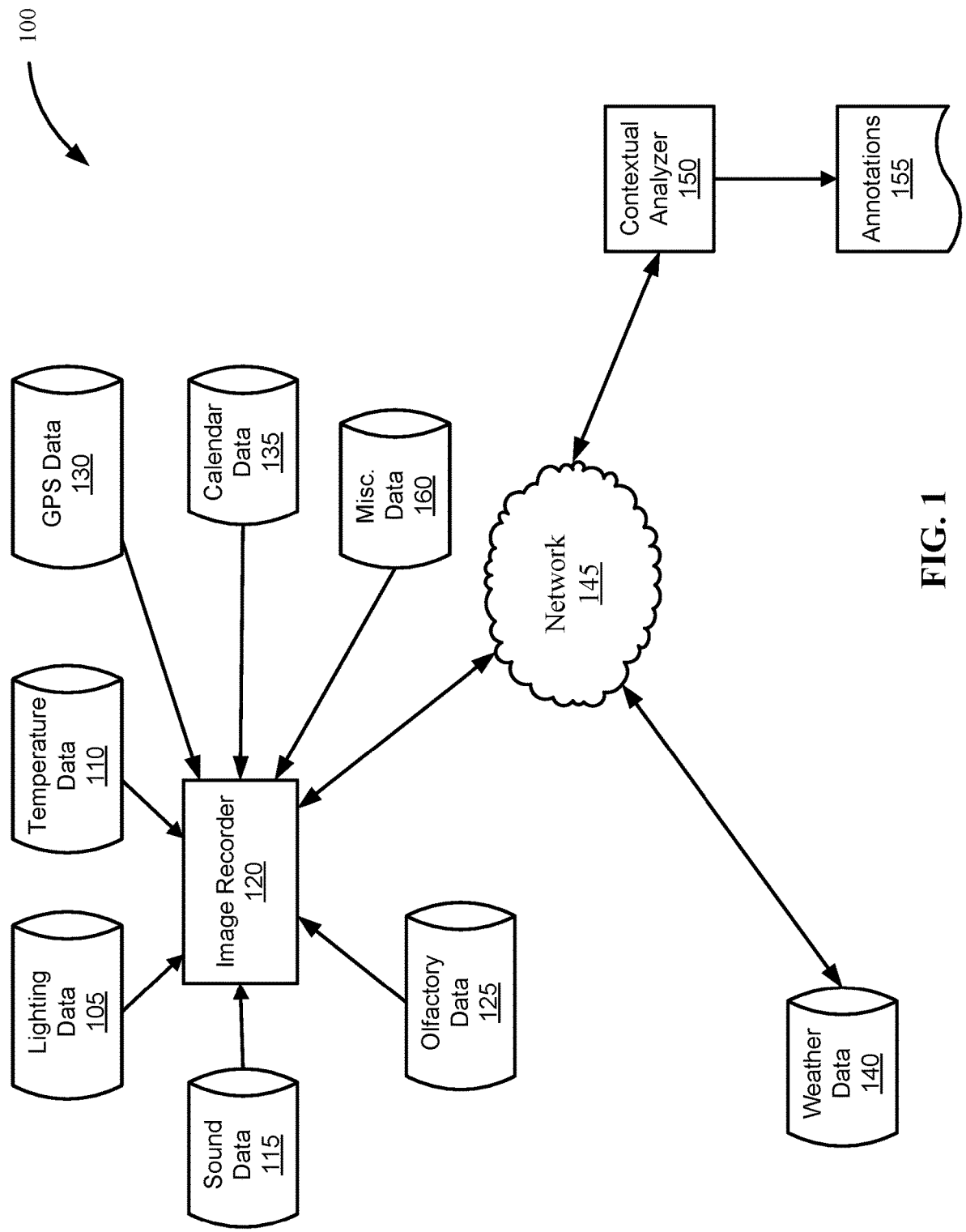
FIG. 1 illustrates an example networking environment, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of content creation and presentation, and more particularly to enhancing images using environmental context. While the present disclosure is not necessarily limited to such applications, various aspects of the disclosure may be appreciated through a discussion of various examples using this context.

Individuals may create images/videos to commemorate notable occasions, to create memories, remember significant experiences, and for a host of other reasons. The present disclosure aims to enhance images through the collection of data that provides context to the image itself. This contextual data may be used when the image or video is played back to the individual to enhance the playback experience and create a feeling as close to the original experience as possible. In the event that the individual does not own rights/privileges to access contextual artifacts called for by the contextual data, purchase options may be presented to the individual.

For example, an image/video will necessarily contain embedded visual information from which some context may be inferred; however, it may lack contextual information (e.g., information regarding sounds, scents, weather, humidity, temperature, location/global positioning system (GPS) information, etc.) that could be employed, upon playback, to enhance the viewer's experience and recapture the feeling/experience that was present when the image/video was first captured. In embodiments, the contextual information/data may be captured using sensors attached to the image recorder (e.g., camera, video camera, smartphone, etc.), and/or it may be captured by searching for archival information (e.g., harvesting data from online resources, accessing an individual's media streaming accounts, accessing publicly available media on the Internet, accessing an individual's local data and media, etc.)

As another example, an individual/user may have captured an image or video of a concert, play, or other live event. Sensors attached to the device that recorded the image/video may capture certain contextual data, such as the music that was playing at the time, the temperature and humidity of the room, the lighting wavelengths (e.g., colors) and intensities (e.g., brightness/luminosity), the location (e.g., using GPS data), the micro-climate (e.g., small weather-related conditions that may not be reported in regional/national weather reports), olfactory information (e.g., scents/fragrances), date/time, etc. Information describing this set of contextual data may be annotated and attached to the image/video as metadata. In embodiments, this may be achieved using exchangeable image format (EXIF). The information describing the set of contextual data may be shortened or abbreviated, to conserve computing resources and reduce the amount of metadata and overall size of the media file.

Once a user initiates the playback/display of the media file, a playback device may utilize the contextual data to recreate, as best as possible, the experience captured by the image/video. For example, the contextual data may call for a lower light intensity, and a particular song. In a playback environment compatible with Internet of Things (IoT) technology, the lights could automatically be adjusted to the proper intensity described in the contextual data in the metadata annotations, and the song could be retrieved from a higher quality source. For example, instead of playing the song captured on the video, it may be pulled from the user's personal music collection and played with recording-studio quality. In embodiments, the user may not own the particular song, and so the device may look up where the song may be purchased online and present the option to purchase/rent to the user. In this way, the user's playback experience may be enhanced to become substantially similar, or perhaps even superior, to the original experience.

In a similar manner, and with the proper IoT devices, nearly every physical sensation recorded into the contextual data may be reproduced to enhance the user's playback experience. Such enhancements may relate to any of the senses: touch (e.g., temperature, humidity levels may be adjusted by IoT climate controls), sight (e.g., ambient light color and intensity may be adjusted), scent (e.g., the scent of a beach or of a particular meal may be dispensed from a scent diffuser), sound (e.g., musical or other audio-based performances, book readings, poetry readings, etc. may be played on an IoT sound system), and taste (e.g., food or drink recipes may be suggested or dispensed at an IoT refrigerator or on an IoT stove/oven, or food matching the contextual data may be suggested for purchase/order on a user's device).

Referring now to FIG. 1, illustrated is an example networking environment 100, in accordance with embodiments of the present disclosure. Example networking environment 100 may include a network 145, a contextual analyzer 150, an image recorder 120, lighting data 105, temperature data 110, sound data 115, olfactory data 125, GPS data 130, calendar data 135, weather data 140, miscellaneous data 160, and annotations 155.

In embodiments, image recorder 120 may include a camera, video camera, smart phone, or any other device capable of capturing images and/or video. Image recorder 120 may be equipped with various sensors (not pictured), either natively installed or subsequently added thereto. The image recorder 120 may use these sensors to capture contextual data to provide greater detail regarding the context of the image(s) via metadata annotations.

For example, image recorder 120 may include a light sensor capable of sensing and capturing lighting data 105. Lighting data 105 may include information regarding the various colors (e.g., electromagnetic wavelengths) and their intensities. As described herein, lighting data 105 may be annotated to a captured image to enhance later viewing/playback.

In embodiments, image recorder 120 may include a temperature sensor for sensing and capturing temperature data 110. In embodiments, the temperature sensor may be combined with the lighting data sensor (e.g., to capture infrared information/data), or it may be a separate temperature sensor. Temperature data 110 may include information regarding the ambient temperature of the space depicted in a capture image. In embodiments where infrared technology is employed, temperature data 110 may include temperature information for particular items/objects (e.g., a fire, a fan, overclocked electronics, an air conditioning unit, etc.) within a captured image, and this information may be mapped spatially. This may be particularly helpful when reconstructing the experience of certain captured images (e.g., a beachside bonfire or other image where there may be drastic temperature differences among depicted objects).

In embodiments, image recorder 120 may include a microphone or other audio sensor for capturing sound data 115. In embodiments, multiple audio sensors may be employed to allow for enhanced spatial mapping of sounds (e.g., echolocation techniques). Sound data may include, for example, conversations, songs, ambient noise, etc. In embodiments, spatial mapping of sounds may enhance playback experiences in surround-sound enabled environments.

In embodiments, image recorder 120 may include an olfactory sensor for sensing and capturing olfactory data 125. Olfactory data 125 may include the predominant scent(s) or a combination of scents present in the captured image. In embodiments, multiple olfactory sensors may be employed to allow for spatial mapping of the ambient scents (e.g., the capture of a set of olfactory data) associated with the image.

In embodiments, image recorder 120 may include a GPS module and a clock/calendar for determining and recording time and location information (e.g., calendar data 135 and GPS data 130, respectively). In embodiments, contextual data may be looked up and/or approximated using archival sources for a particular time and location, using the GPS data 130 and calendar data 135.

In embodiments, image recorder 120 may include a sensor or module for sensing and capturing miscellaneous data 160. Miscellaneous data may include contextual data inferred by the presence/absence of other users' devices in a proximity of the image recorder 120, or the social media "presence" of other users who have "checked in" or otherwise been in proximity to a location of the image recorder 120. In embodiments, miscellaneous data 160 may include inferences drawn from a combination of other data types.

For example, it is contemplated that some image recorders may employ none, one, some, or all of the sensors described herein, and therefore some contextual data may be lacking. However, GPS data 130 and calendar data 135 may be used to look up information on the Internet or in other archival sources (e.g., libraries, scientific research stations, personal archives, etc.) to mitigate the effects of any lacking data. For example, if an image recorder 120 does not include a temperature sensor, any number of online weather databases storing weather data 140 (e.g., news station websites, government websites, farmers' almanacs, etc.) may be queried for the temperature at or near the location depicted in the captured image and for the time the image was captured.

In embodiments where an image recorder lacks access to GPS data 130 and calendar data 135, a user may input the information, or an approximation thereof, to allow the image recorder 120 access to GPS data 130 and calendar data 135.

It is contemplated that the various objects depicted in example networking environment 100 will be communicatively coupled, at least intermittently, via a network 145. Network 145 may be any type or combination of networks. For example, network 145 may include any combination of personal area network (PAN), local area network (LAN), metropolitan area network (MAN), wide area network (WAN), wireless local area network (WLAN), storage area network (SAN), enterprise private network (EPN), or virtual private network (VPN). In some embodiments, the network 145 may refer to an IP network, a conventional coaxial-based network, etc. For example, contextual analyzer 150 may communicate with various client devices (e.g. tablets, laptops, smartphones, portable terminals, image recorder 120, a server containing weather data 140, etc.) over the Internet.

In some embodiments, the network 145 can be implemented within a cloud computing environment or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 145. Cloud computing is discussed in greater detail in regard to FIGS. 5 & 6.

Contextual analyzer 150 may be a standalone computing system, a virtual machine running on a hypervisor, or an application. In embodiments, contextual analyzer 150 may be a component or application within image recorder 120. Contextual analyzer 150 may create and append annotations 155 to a captured image.

In embodiments, contextual analyzer 150 may employ image analysis techniques (e.g., image recognition, facial recognition, object recognition, natural language processing, etc.) to identify subjects (e.g., objects, people, events, signs and other text, etc.) within a captured image. In this way, additional contextual data may be incorporated into annotations 155 that may not have been detected by any of the sensors discussed herein. For example, an image of a particular meal may be used to identify the dish(es) therein and lookup olfactory data 125 for those dishes. In embodiments, contextual analyzer 150 may employ neural networking techniques to perform the image analysis.

In embodiments, contextual analyzer 150 may employ EXIF to create the annotations 155 for the captured images, as described herein. Annotations 155 may include information on the contextual data gathered. In embodiments, the information on the contextual data may be condensed or abbreviated to conserve memory and computing resources. In embodiments, parallel computing techniques (e.g., Single Instruction Multiple Data) may be employed to create annotations 155 from multiple contextual data sources simultaneously (e.g., at the same moment in time and/or at substantially similar moments in time, such that substantially all data from the contextual data sources relates directly to the captured image(s)).

Figure 2:
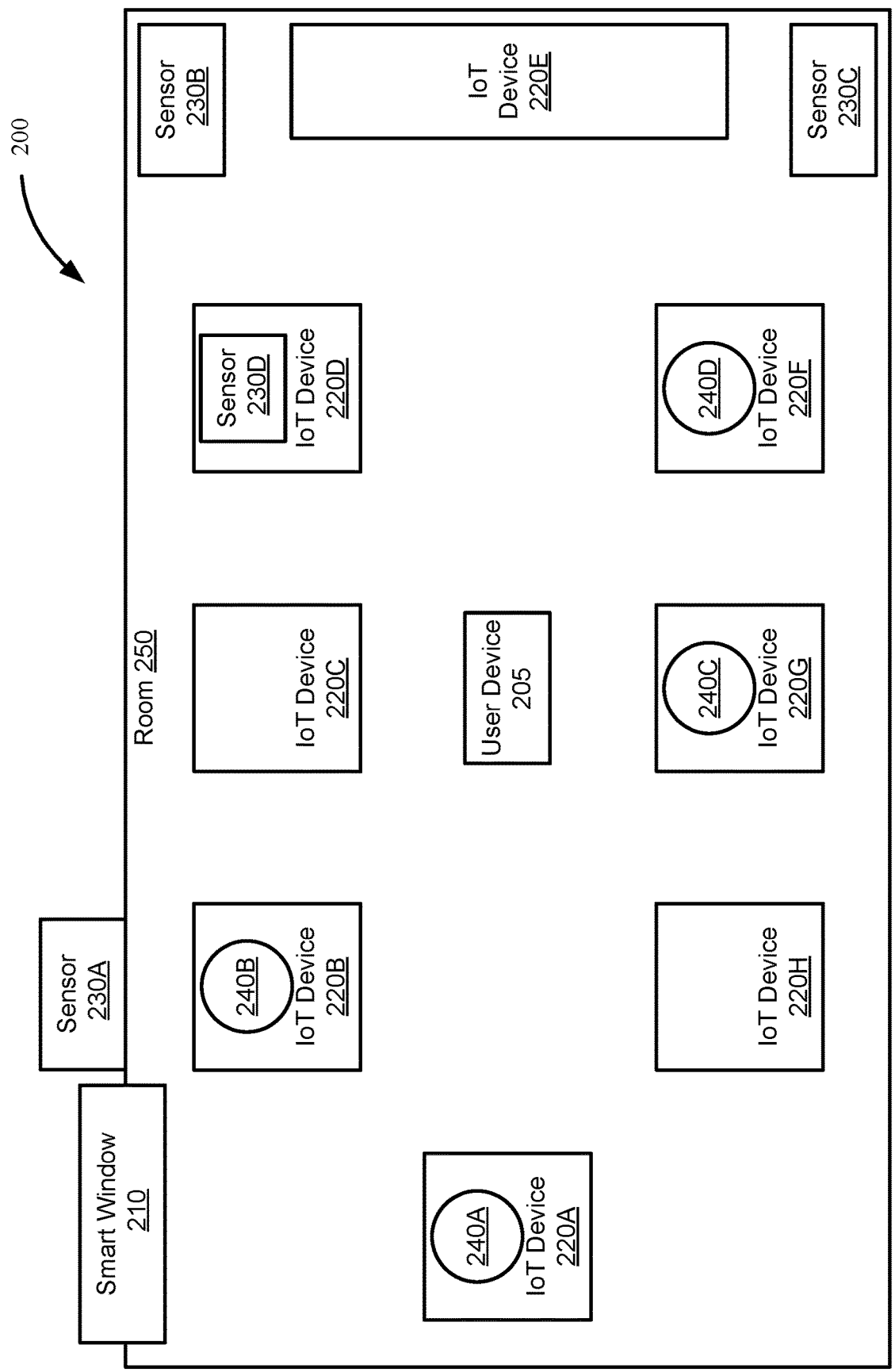
FIG. 2 illustrates an example playback environment, in accordance with embodiments of the present disclosure.

Referring now to FIG. 2, illustrated is an example playback environment 200, in accordance with embodiments of the present disclosure. In embodiments, example playback environment 200 may be a room 250, including various IoT devices 220A-220H, a user device 205, smart window 210, and sensors 230A-230D.

A user may interact with user device 205 to initiate a playback or viewing of previously captured image or video. In embodiments, user device 205 may be substantially similar to image recorder 120 of FIG. 1, or it may be a separate computing device, or it may be an application or component integrated into another computing device.

In embodiments, user device 205 may access metadata (e.g., EXIF annotations) appended to the images/videos to determine whether information on contextual data is present. If so, the user device 205 may use this information to look up contextual artifacts that may enhance the playback and aid in recreated the experience and feel that was present when the image/video was captured. User device 205 may cause other devices within room 250 to engage in a playback enhancing experience. User device 205 may display the image/video itself, or it may be projected to a compatible television or display/monitor, such as IoT device 220E.

For example, user device 205 may determine, from the information on the contextual data, that a particular song (e.g., an audio-based contextual artifact) was playing at the time the image was captured. The user device may search for a high-fidelity recording of that song that best matches the environment of the image (e.g., if the image was at a live concert the user device may identify a version from a professional recording of a live concert, whereas if the image was associated with the song played over the radio the user device may identify an edited radio version, or if the image was associated with the song playing from an album the user device may identify the studio version of the song). The user device may cause an IoT sound system to play that song at the appropriate volume level, as dictated in the annotations. In this way, a user may be presented with contextual artifacts to replicate the experience captured in the image/video. In embodiments, spatial audio mapping data may be read from the annotations, and a surround sound system may cause the song playback to come from a particular direction, oriented either based on the user's physical orientation or the user device 205's orientation. In this way, both the specific version of the identified song and the direction from which the song is played back may mimic the original experience during which the image/video was captured.

In embodiments, user device 205 may communicate with smart window 210, in response to processing an annotation related to light levels, to cause the smart window to allow more or less light into room 250. In embodiments, this may be achieved by reducing or increasing the area of bare glass in the window, or it may be achieved through a darkening/lightening of the transparent material that makes up the window.

In embodiments, sensors 230A-230D may monitor the playback experience and regulate any needed change in the environment of room 250 in order to maintain fidelity to the experience captured in the image/video.

As discussed herein, it is contemplated that a user may not have access privileges for all the contextual artifacts needed to enjoy the best possible playback experience. In such circumstances, the various IoT devices 220A-22H may look up purchase options and provide notifications 240A-240D to the user. In embodiments, notifications 240A-240D may be from a singular vendor, or they may be from a plurality of vendors.

As an example of an enhanced playback experience, the user may be viewing an image of a Thanksgiving dinner. The annotations may indicate that the lighting was at 70% intensity, and that it was predominantly soft white in color; the scent of pumpkin pie and turkey dominated; the dishes roast turkey, cranberry sauce, sautéed mushrooms, green beans, mashed potatoes and gravy, and pumpkin pie were served. Other data (e.g., GPS data, temperature data, etc.) may also be included.

User device 205 may communicate with the relevant IoT devices (e.g., smart window 210, an IoT scent diffuser, a smart television, IoT refrigerator, IoT oven, IoT lights, etc.) to determine whether contextual artifacts may be presented to the user. In this example, contextual artifacts may include the scents of pumpkin pie and turkey, soft white lighting at 70% intensity, and the various dishes listed. In response, the IoT devices may dim the lights to 70% and change the light hue to soft white. An IoT scent diffuser may mix a scent approximating pumpkin pie and turkey and release it. An IoT oven may look up a recipe for roast turkey and present it to the user. Any recipes missing from the user's personal recipe database may either be looked up and presented to the user, or purchase options for the missing recipes may be provided (e.g., single recipes, cookbooks containing the relevant recipes, etc.). In embodiments, the user may be presented with options to purchase food for delivery/takeout.

In other embodiments, the user may be presented with purchase options for travel plans to revisit the area/environment captured in an image/video.

Sensors 230A-230D may monitor the environment within room 250 and regulate the ambience for fidelity with the information recorded in the annotations of the image/video. In embodiments where videos are employed, the environment of room 250 may be adjusted to match any changes in the captured video. For example, still frames of the video may be annotated using unique sets of contextual data which may be used to capture any changes. For example, if at some point in the video there was a change in light or temperature or smell or the like from an event (e.g., fireworks, pyrotechnics, a candle being blown out, etc.), sensors 230 may dynamically modulate the devices in the room 250 such that the environment of the room 250 match these changes (e.g., temporarily scaling up light in one area of the room 250 that is associated with the fireworks or pyrotechnics, dimming a light and releasing a scent of smoke in an area of the room 250 that is associated with the candle, etc.)

Figure 3:
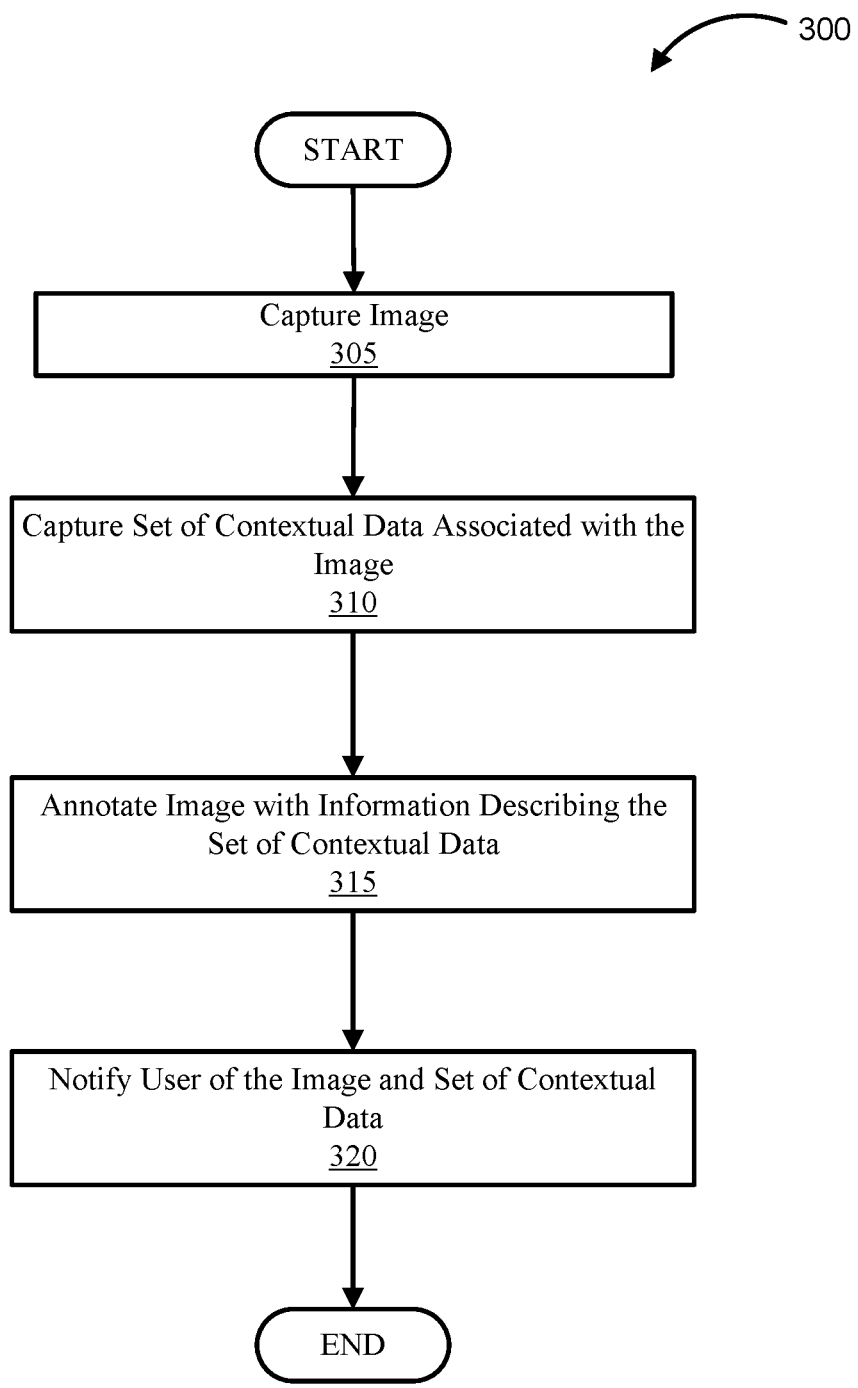
FIG. 3 illustrates a flowchart of a method for enhancing an image by annotating the image with information describing contextual data, in accordance with embodiments of the present disclosure.

Referring now to FIG. 3, illustrated is a flowchart of method 300 for enhancing an image by annotating the image with information describing contextual data, in accordance with embodiments of the present disclosure. Method 300 may begin with the capture of an image at 305. Images may be captured by a camera or other recording device as described herein.

At 310, a set of contextual data associated with the image is captured. Contextual data may include, for example, lighting intensity and color, audio data/sound, olfactory data, temperature data, GPS data, calendar data, weather data, etc. In embodiments, contextual data may need to be gathered or generated (e.g., in the case of image recognition techniques to identify objects within the image, and/or identifying a spatial mapping of the objects within the image).

At 315, the image is annotated with information describing the set of contextual data. In embodiments, this may be the contextual data itself, or it may be abbreviated or condensed information that allows for the identification of the contextual data or a particular contextual artifact. For example, the contextual data may be a recording of a particular song—this recording may, in embodiments, be annotated to the image directly, or the name of the song may be annotated to the image to facilitate the lookup and playback of the song from another source.

At 320, a user is notified of the image and set of contextual data. In embodiments, this may include any notification regarding the completion of the annotation process. This may be achieved through pop-up windows, checkmarks or other verification symbols, texts, emails, sounds, vibrations, etc. As used herein, "image" may refer to a static image, a slideshow, a video, or the still frames that make up a video.

Figure 4:
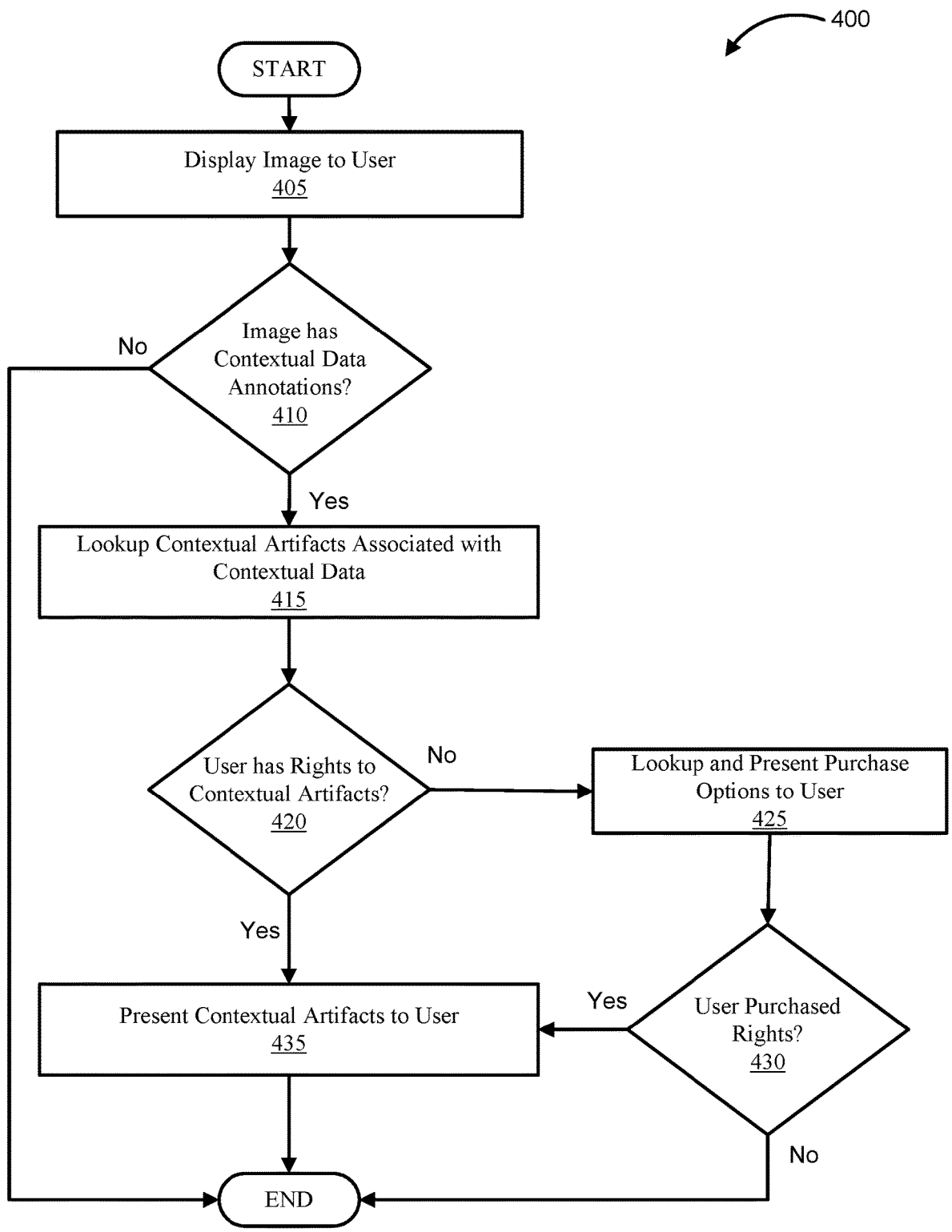
FIG. 4 illustrates a flowchart of a method for presenting a user with contextual artifacts for an enhanced playback experience, in accordance with embodiments of the present disclosure.

Referring now to FIG. 4, illustrated is a method 400 for presenting a user with contextual artifacts for an enhanced playback experience, in accordance with embodiments of the present disclosure. Method 400 may begin in response to a user initiating a playback of an image. At 405, the image is displayed to the user. This may be achieved either on a device the user is interacting with directly, or the image may be displayed on a companion device, such as a television, projector, holographic projector, etc.

At 410, it is determined whether the image contains any contextual data annotations. In embodiments, a user device may check the image for EXIF, or any other suitable annotation formats. If no contextual data annotations are present, the method may terminate.

If, at 410, it is determined that contextual data annotations exist, then a lookup of contextual artifacts associated with the contextual data may be performed at 415. For example, if the image contains an annotation indicated that the temperature-related contextual data calls for 72 degrees Fahrenheit, then a smart thermostat may be identified and a temperature of 72 degrees Fahrenheit may be requested.

At 420, it is determined whether the user has access rights to the contextual artifacts. If the user does have the required access rights, then the contextual artifact is presented to the user at 435. For example, if the user has access privileges to the smart thermostat, then the requested temperature of 72 degrees Fahrenheit may be initiated by the smart thermostat.

If, however, it is determined the user does not have access rights to the contextual artifact at 420, then purchase options for those access rights may be looked up and presented to the user at 425. For example, if the desired contextual artifact is a particular song, then an IoT sound system may present purchase options from a music streaming service to the user.

At 430, it is determined whether the user purchased the access rights. If the user did not purchase the access rights, then the method terminates. If, however, the user opted to purchase the access rights at 430, the contextual artifact will be presented to the user at 435. For example, if the user decided to purchase a digital copy of a particular song, the song may be played back to the user.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
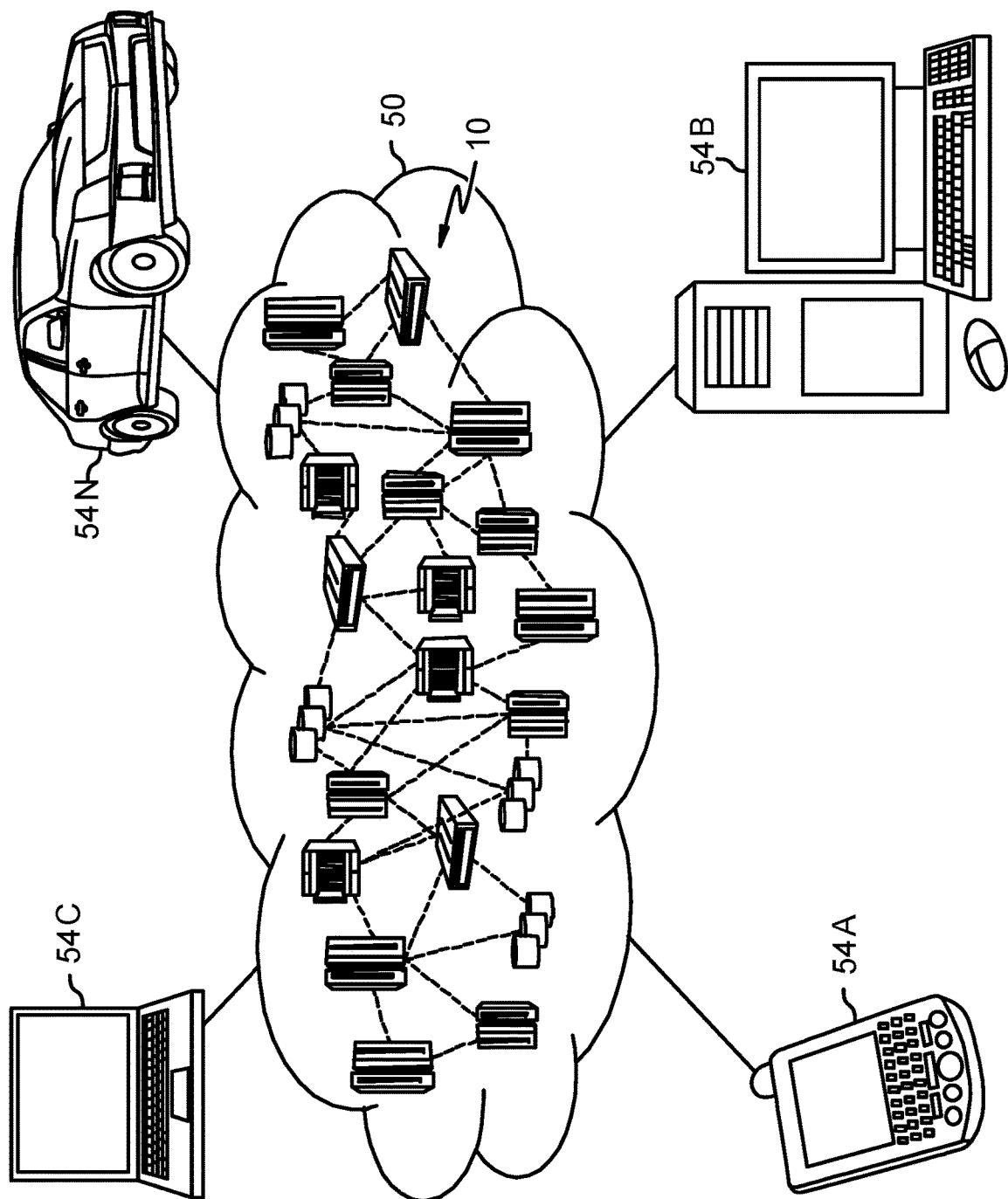
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
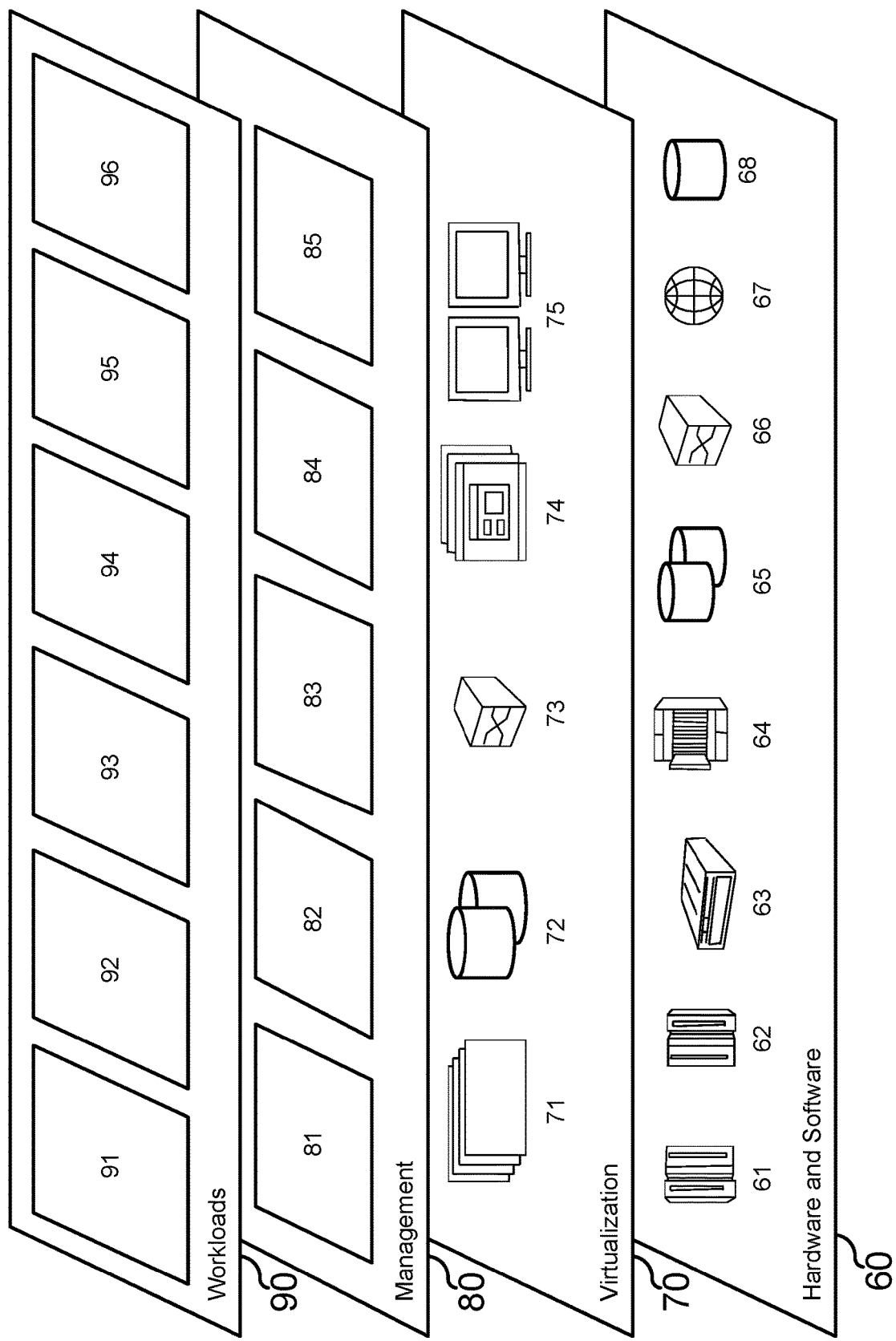
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enhancing image playback using contextual data 96.

Figure 7:
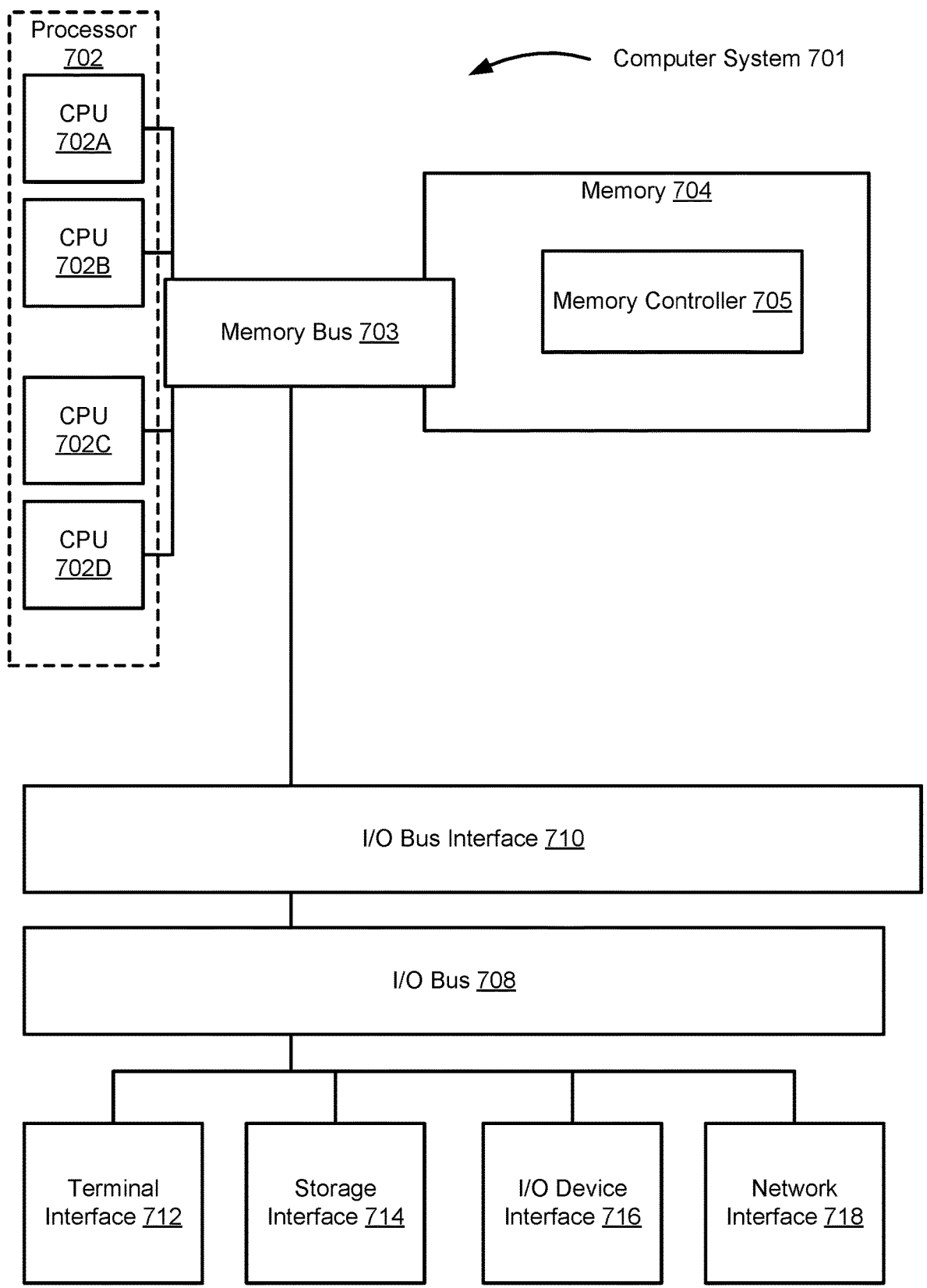
FIG. 7 illustrates a high-level block diagram of an example computer system that may be used in implementing embodiments of the present disclosure.

Referring now to FIG. 7, shown is a high-level block diagram of an example computer system 701 that may be configured to perform various aspects of the present disclosure, including, for example, methods 300/400, described in FIGS. 3 and 4, respectively. The example computer system 701 may be used in implementing one or more of the methods or modules, and any related functions or operations, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for enhancing an image with contextual data, the method comprising:
    capturing the image with an image recorder, the image including a first object having a first temperature and a second object having a second temperature that is different from the first temperature;
    capturing a set of contextual data associated with the image, the set of contextual data comprising a spatial map of the first temperature and the second temperature;
    displaying the image; and
    presenting, in response to displaying the image, one or more contextual artifacts associated with the set of contextual data,
    wherein presenting the one or more contextual artifacts comprises utilizing the spatial map to modify a third temperature.

2. The method of claim 1, wherein the one or more contextual artifacts includes one or more scents.

3. The method of claim 1, wherein the one or more contextual artifacts includes a set of ambient lighting characteristics.

4. The method of claim 3, wherein the set of ambient lighting characteristics includes a set of light wavelengths and intensities.

5. The method of claim 1, wherein the one or more contextual artifacts is selected from the group consisting of temperature, humidity, sounds, one or more recipes, and travel purchase information.

6. The method of claim 1, wherein a first subset of the set of contextual data is captured, concurrently with the image, using a set of sensors communicatively coupled to the image recorder.

7. The method of claim 6, wherein the first subset of the set of contextual data is selected from the group consisting of temperature data, sound data, Global Positioning System (GPS) data, light data, olfactory data, and micro-climate data.

8. The method of claim 1, wherein a second subset of the set of contextual data is captured from archival sources.

9. The method of claim 8, wherein the second subset of set of contextual data is selected from the group consisting of sound data, weather data, and calendar data.

10. The method of claim 9, further comprising:
    annotating the image with information describing the set of contextual data,
    wherein the information includes metadata in exchangeable image file format.

11. The method of claim 1, wherein a third subset of the set of contextual data is generated using image analysis techniques on the image to identify environmental objects and conditions.

12. The method of claim 1, further comprising:
    determining that a user does not have access rights to a first contextual artifact associated with the set of contextual data;

presenting, in response to the determining, an option to purchase the access rights; and presenting, in response to the user purchasing the access rights, the first contextual artifact.

13. A system for enhancing an image with contextual data, comprising:

a memory with program instructions included thereon; and a processor in communication with the memory, wherein the program instructions cause the processor to:

capture the image with an image recorder, the image including a first object having a first temperature and a second object having a second temperature that is different from the first temperature;

capture a set of contextual data associated with the image, the set of contextual data comprising a spatial map of the first temperature and the second temperature;

display the image; and present, in response to displaying the image, one or more contextual artifacts associated with the set of contextual data, wherein presenting the one or more contextual artifacts comprises utilizing the spatial map to modify a third temperature.

14. The system of claim 13, wherein a first subset of the contextual data is captured, concurrently with the image, using a set of sensors communicatively coupled to the image recorder.

15. The system of claim 13, wherein the one or more contextual artifacts is selected from the group consisting of temperature, humidity, sounds, one or more recipes, and travel purchase information.

16. The system of claim 13, wherein the program instructions further cause the processor to:

determine that a user does not have access rights to a first contextual artifact associated with the set of contextual data;

present, in response to the determining, an option to purchase the access rights; and present, in response to the user purchasing the access rights, the first contextual artifact.

17. A computer program product for enhancing an image with contextual data, the computer program product comprising a computer readable storage medium having program instructions embodied therewith, the program instructions executable by a device to cause the device to:

capture the image with an image recorder, the image including a first object having a first temperature and a second object having a second temperature that is different from the first temperature;

capture a set of contextual data associated with the image, the set of contextual data comprising a spatial map of the first temperature and the second temperature;

display the image; and present, in response to displaying the image, one or more contextual artifacts associated with the set of contextual data, wherein presenting the one or more contextual artifacts comprises utilizing the spatial map to modify a third temperature.

18. The computer program product of claim 17, wherein a first subset of the contextual data is captured, concurrently with the image, using a set of sensors communicatively coupled to the image recorder.

19. The computer program product of claim 17, wherein the program instructions further cause the device to:

determine that a user does not have access rights to a first contextual artifact associated with the set of contextual data;

present, in response to the determining, an option to purchase the access rights; and present, in response to the user purchasing the access rights, the first contextual artifact.

20. The computer program product of claim 19, wherein the program instructions further cause the device to:

present one or more additional contextual artifacts associated with the set of contextual data, wherein the one or more additional contextual artifacts is selected from the group consisting of temperature, humidity, sounds, one or more recipes, and travel purchase information.

* * * * *